May 26, 1931.  W. H. BATH  1,806,929
LIQUID SEAL
Filed April 6, 1925  2 Sheets-Sheet 1
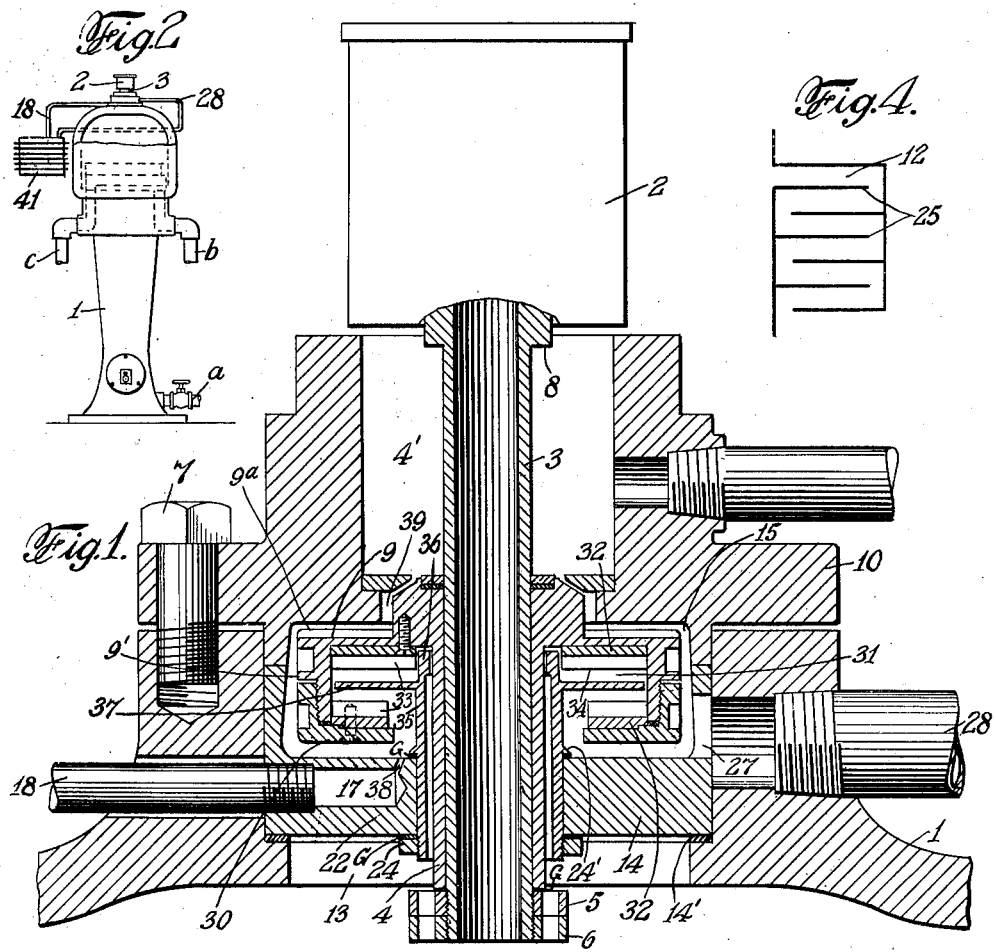
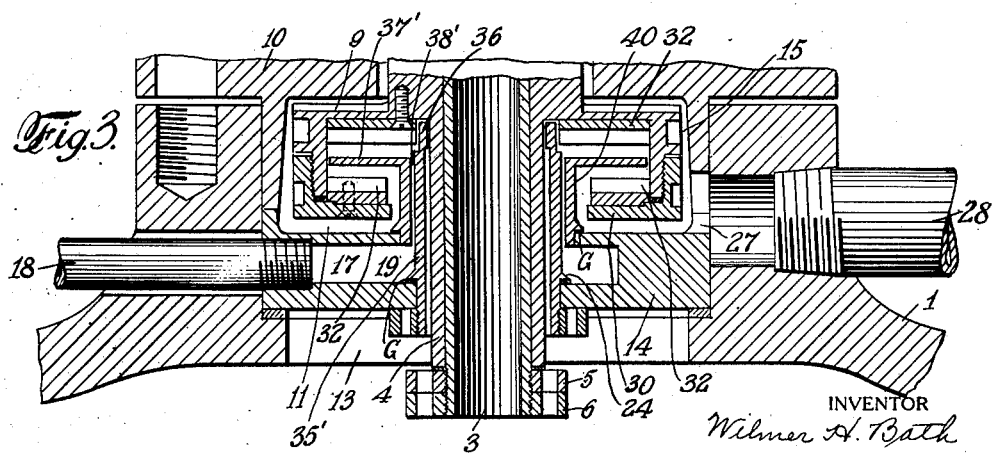
INVENTOR
Wilmer H. Bath
BY
Kenyon & Kenyon
ATTORNEYS May 26, 1931.  W. H. BATH  1,806,929
LIQUID SEAL
Filed April 6, 1925   2 Sheets-Sheet 2

INVENTOR
Wilmer H. Bath
BY Kenyon & Kenyon
ATTORNEYS.

Patented May 26, 1931

1,806,929

UNITED STATES PATENT OFFICE

WILMER H. BATH, OF WEST CONSHOHOCKEN, PENNSYLVANIA, ASSIGNOR TO THE SHARPLES SPECIALTY COMPANY, OF PHILADELPHIA, PENNSYLVANIA, A CORPORATION OF DELAWARE

LIQUID SEAL

Application filed April 6, 1925. Serial No. 20,981.

My invention relates to a method and apparatus whereby a clearance or space between two bodies may be sealed by a liquid seal, an important application of my invention being the sealing of the clearance between two relatively moving bodies.

When the space of clearance between two bodies is sealed with a liquid seal, relative movement of those bodies, particularly when such relative movement is at a high rate, and vibration of either one or both of the bodies and erratic or otherwise irregular motion of one or both of the bodies, all tend to distort or deform or disperse the liquid of the seal or otherwise reduce the effectiveness of the liquid seal. If one of the bodies moves at a very high rate of speed with respect to the other, a solid packing is difficult to maintain and will consume a large amount of energy and produce undesirable heating. It is practically impossible to maintain a solid packing if either or both of the bodies is subjected to vibration or erratic or irregular motion. Under some circumstances and particularly when a vacuum is to be maintained the heating of even a liquid seal may prevent such a seal from being effective.

It is an object of my invention to provide a method and apparatus whereby a liquid seal is produced that is simple and readily maintained and which will overcome the difficulties heretofore encountered.

A further object of my invention is to provide means whereby a liquid seal may be produced and whereby it may be maintained and whereby it may be cooled if necessary.

A further object of my invention is to provide means whereby a liquid seal may be automatically replenished with a sealing liquid, a further object being the provision of a liquid seal wherein circulation of the sealing liquid is automatically effected as by the differential of pressure on opposite sides of the seal.

A further object of my invention is to utilize centrifugal force produced by rotation of a body to augment the effectiveness of a liquid seal between that body and another body.

Other objects and advantages of my invention will appear from the following description taken in connection with the accompanying drawings that form a part of this specification and in which for the purpose of aiding in the understanding of my invention I have described certain applications and embodiments thereof with the understanding that such applications and embodiments are merely illustrative of various applications and embodiments that may be made.

In accordance with my invention a body of sealing liquid is maintained in effective form and condition and in proper relation to the bodies between which a seal is to be effected advantageously by maintaining a body of liquid in rotation in order that the effect of centrifugal force is utilized to those ends. If the rotating body of liquid is supported and rotated by one of two members between which a seal is to be maintained a sealing member connected to the other of such bodies is contacted by the sealing liquid. In accordance with my invention the sealing liquid that is acted upon by centrifugal force may be in liquid balance on opposite sides of the sealing member with the result that small differences in the effective level of the liquid on opposite sides of the sealing member may maintain an unusually large pressure differential on opposite sides of the seal, the effective depths of liquid on opposite sides of the sealing member being intensified in proportion to the centrifugal force acting upon the liquid.

Also in accordance with my invention a circulation of sealing fluid may be maintained in order not only to replenish the liquid but to cool it if desirable as in the case where a vacuum is maintained. Also in accordance with my invention the differential in pressure on the opposite sides of the seal may be utilized in causing a circulation of the sealing liquids; and furthermore the rotation of one of two parts between which a seal is to be preserved may be utilized in causing a circulation of the sealing liquid.

One particular application of my invention resides in the sealing of a drive-shaft that extends into an enclosing casing and drives a centrifugal bowl therein, a pressure or vacuum or circulation of active or inactive or hot or cold gas being maintained within the enclosure as desired in order to regulate of the atmosphere within which a substance is treated in and discharged from the centrifugal bowl.

In the drawings:

Fig. 1 is a vertical sectional view of a liquid seal embodying my invention.

Fig. 2 is an elevation of an enclosed centrifuge having incorporated therein a liquid seal embodying my invention.

Fig. 3 is a modification of the construction shown in Fig. 1.

Fig. 4 is a diagrammatic showing of a further modification of apparatus embodying my invention.

Figure 5:
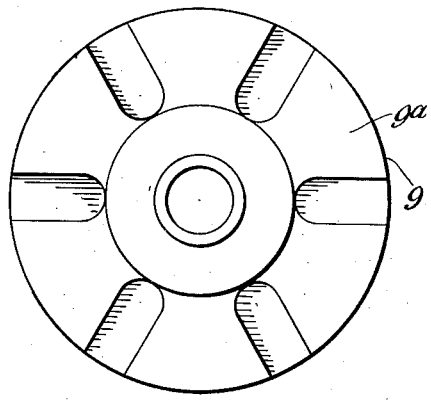
Figs. 5 and 6 are detail views.

In the drawings, in which are shown merely illustrative embodiments of my invention and apparatus whereby my invention may be practised, there is shown a casing or enclosure provided with an opening through which a shaft extends, the clearance or space between the edge of the opening and the shaft being sealed by apparatus embodying my invention. The enclosure may among other purposes be employed to enclose a centrifugal machine, the rotor of which may be driven by means of the pulley 2 and the shaft or quill 3 that extends into the enclosure that is provided with supply and discharge passages $a$, $b$ and $c$. Such an enclosed centrifugal machine and the details whereby the shaft or quill 3 is supported therein and whereby the spindle of the bowl is connected thereto are more particularly disclosed in the application of Leo D. Jones and Arthur U. Ayres, Serial No. 710,388, filed May 1, 1924, such details of construction forming no part of my present invention and being referred to as one example of a construction wherein my invention may be employed.

The enclosure 1 is provided with an opening 13 within which a base member 14 is sealed by means of a gasket 14' and held in place by means of a supporting member 10 that rests thereon and is secured to the enclosure 1 as by one or more bolts 7. The base member 14 and supporting member 10 are hollowed out to provide a chamber 15 wherein the sealing device is mainly positioned.

In accordance with my invention a body of liquid is maintained in rapid rotation and a sealing member extends into that liquid, the effective depth, and therefore the effective strength, of the seal being augmented by reason of the fact that centrifugal force is acting upon the seal-liquid. To this end a sleeve 4 is held in position on the shaft 3 by means of nuts 5 and 6 that press the sleeve 4 against bearings in the space 4' that are held against sliding on the shaft 3 by the shoulder 8. The bearings in the space 4' center the shaft or quill 3 with respect to the opening 13 in the casing or enclosure 1. Preferably integral with the sleeve 4 is the flange 9 having a tubular extension 9' onto which is threaded or otherwise secured an inwardly extending flange 30, the flanges 9' and 30 forming a liquid chamber 31 that is secured through the intervention of the sleeve 4 to the shaft or quill 3. Within the central opening of the base member 14 a cylindrical shell 35 is held in place as by the nut 24 on the lower side of the base member 14 and the shoulder 24' on the upper side of the base member 14. It is desirable to provide gaskets G between the base member 14 and the nut 24 and shoulder 24' and also between the nut 5 and the sleeve 4.

The top of the pulley 2 is closed to prevent any flow of gas or vapors through the quill 3.

Figure 6:
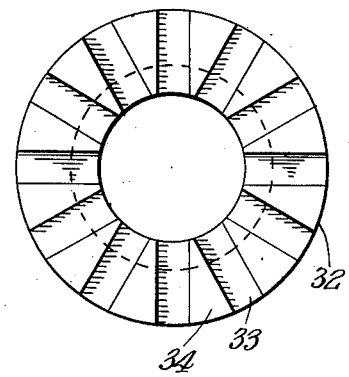

When the quill 3 is rotating a body of liquid contained in and rotating with the chamber 31 that is carried by shaft 3 will be under the influence of centrifugal force. The shell 35 carries a radially extending flange or sealing member 37 that projects into the liquid carried by the chamber 31 and since sealing member 37 is carried by casing 1 through the intervention of the base member 14 and the shell 35, the immersion of the sealing member 37 in that liquid will effect a liquid sealing of the clearance or space between the rotating shaft 3 and the casing 1. A pressure within the casing 1 will be transmitted upwardly between the shell 35 and the sleeve 4 to space in the liquid chamber 31 above the sealing member 37 and tend to cause the surface of the liquid in that space to move radially outward and to cause the surface in the space below the sealing member 37 to move radially inward. However, the liquid in the chamber 31 is under the influence of centrifugal force and the difference in the radial positions of the surfaces of the liquid above and below the sealing member 37 will be very much smaller than would be the case if the same pressure were maintained by a liquid seal in which only gravity was acting upon the two legs of the seal. In order that the liquid in the chamber 31 shall certainly rotate therewith in spite of the retarding effect of the stationary sealing member 37, rings 32 are fastened into the liquid chamber 31, said rings being provided with alternating grooves 33 and wings 34 as shown in Fig. 6. In order that a sufficient quantity of sealing liquid shall be maintained in the chamber 31, the base member 14 is provided with a chamber 17 that is provided through the pipe 18 with sealing liquid and with one or more discharge passages 38 that direct the sealing liquid toward the liquid chamber 31. The upper edge 36 of the shell 35 fits between the sleeve 4 and the upper ring 32 and is so proportioned that the clearance around it is restricted in order that sealing liquid may not be carried down into the enclosure 1, and pressure changes within the enclosure will not be too suddenly communicated to the liquid seal. The upper surface of the flange 9 is provided with wings 9a as shown more particularly in Fig. 5 in order to create a slight downward circulation of air through the passage 39 that provides communication between the space 4' in which the bearing for shaft 3 is located and the chamber 15 in order that sealing liquid may not work up into the bearings in the space 4'. Any excess of sealing liquid and anything entering the chamber 15 through the passage 39 will pass off through the opening 27 into the pipe 28. The downwardly expanding form of the side walls of chamber 15 causes liquid that may be swirled around therein to be deflected downward away from the passage 39.

The construction shown in Fig. 3 is in general similar in arrangement and in principle to that shown in Fig. 1 except that sealing liquid is fed to the liquid chamber 31 at a point above the sealing member. To this end a second cylindrical shell 40 is supported by the base member 14 and surrounds and is spaced from a shell 35' that is similar to the shell 35 and is carried by the base member 14. The main difference between the shell 35 and the shell 35' is that the sealing member is not carried by the shell 35' but the sealing member 37' is carried by the shell 40. A passage 38' is thus formed between the shells 35' and 40 and conducts sealing liquid to the upper side of the sealing member 37'. In the construction shown in Fig. 3 the liquid above the sealing member 37' is in communication with the interior of the casing and if a vacuum is maintained within the casing any tendency of the sealing liquid to heat and evaporate under the vacuum is avoided by a fresh supply of cool sealing liquid. Any excess of sealing liquid will pass out over the inner edge of the flange 30, through the opening 27 and out through the pipe 28 from which it may pass into a cooling device 41. The supply pipe 18 extends into the liquid within the cooling device 41 and this liquid may be drawn into the liquid chamber 31 by vacuum within the casing, the effect of which extends around edge 36 of the shell 35'. If the construction shown in Fig. 3 is employed when there is pressure in the enclosure 1 the supply of sealing liquid entering through the pipe 18 must be under a corresponding pressure.

Figure 7:
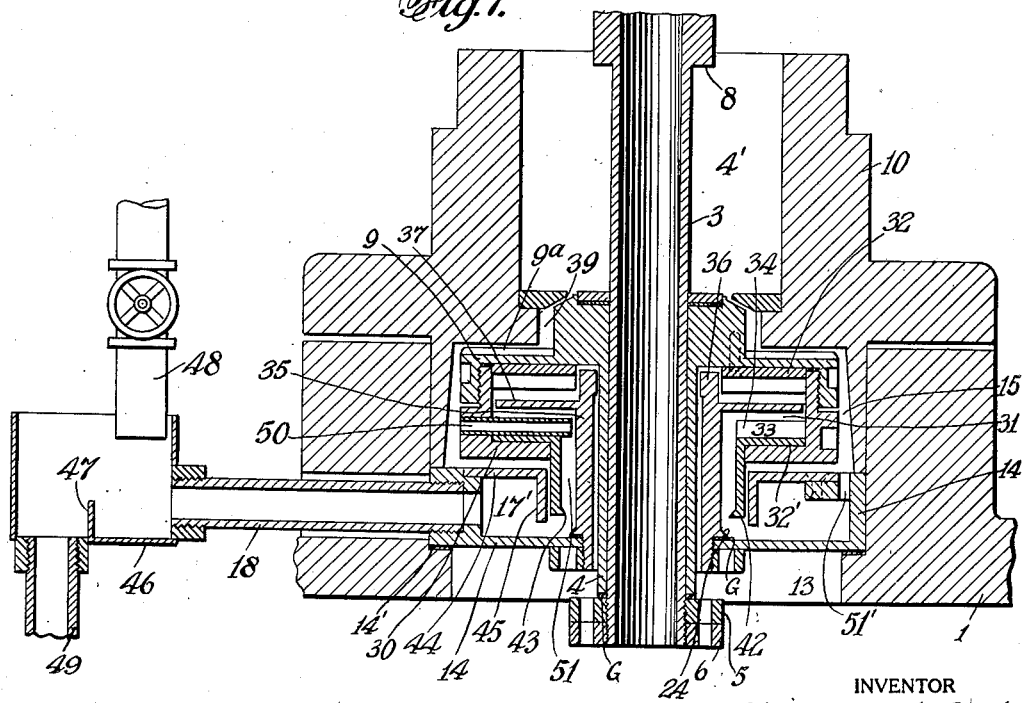
Fig. 7 is a vertical sectional view of a further modification of apparatus embodying my invention.

The construction shown in Fig. 7 is generally similar to that shown in Fig. 1 except that in the construction shown in Fig. 7 there is automatic feeding of sealing liquid to the sealing liquid chamber 31. In the construction shown in Fig. 7 the ring 32' in the lower portion of the liquid chamber 31 is provided with a downwardly extending tubular portion 42 that preferably has an inwardly extending lip 43 that operates as a weir as hereinafter described. The base member 14 is provided with a large chamber 17' for sealing liquid and a disk 44 that forms the upper wall of that chamber is provided with a downwardly extending tubular flange 45 that lies in close proximity to the outer surface of the flange 42 so that rotation thereof is prevented from throwing liquid in chamber 17' out of contact therewith. Sealing liquid is maintained at a desired level in the chamber 17' by means of the supply pipe 18 that leads to a supply chamber 46 wherein a dam 47 maintains a desired level of liquid that is supplied through the pipe 48, excess liquid being passed off through the pipe 49. The level of liquid in the chamber 17' is maintained high enough to bring it into engagement with the flanges 45 and 42. A tube 50 that is positioned radially in the liquid chamber 31 extends preferably along a channel 33 of the ring 32' to a point radially inward of the weir 43.

The wings 9a cause a downward circulation of air in the passage 39 as in the forms shown in Figs. 1 and 3. Rotation of the tube 50 causes air to be centrifugally thrown therefrom thus drawing air from within the passage 51 between the flange 42 and the shell 35. This causes liquid in chamber 17' to be drawn up in that passage over the weir 43 to replenish the liquid in the liquid or sealing chamber 31, in spite of the tendency of the rotation of flange 42 to throw liquid in chamber 17' out of contact with that flange. When the sealing chamber 31 together with the flange 42 and the weir 43 are rotating the position of the radially inward surface of the liquid therein is thus determined by the radial location of the circular weir 43. Air will escape from the chamber 15 in the construction shown in Fig. 7 through the passage 51' into the chamber 17' and thereby prevent an accumulation of air that might interfere with the drawing of sealing liquid over the weir 43.

In cases where it proves desirable the number of chambers for containing sealing liquid may be multiplied and a corresponding number of sealing members extending across those chambers may be employed as diagrammatically indicated in Fig. 4. When vacuum is maintained in the enclosure, it is particularly advantageous to have the clearance around the edge 36 of shell 35 as small as practicable.

From the foregoing it will be apparent that I have provided a method and apparatus whereby a liquid seal may be maintained and wherein the effect of centrifugal force is utilized to increase the normal sealing effect of the liquid employed and wherein the sealing liquid is maintained in such form and location that a seal is produced in spite of a high rate of relative motion between the bodies between which the seal is desired and in spite of vibration of one or the other or both of such bodies and in spite of erratic or irregular motion of either or both of such bodies. From the foregoing it will also be apparent that my method and apparatus provide for a simple feeding of the sealing liquid and even for an automatic feeding of sealing liquid. It is also apparent that by my invention a desired cooling of the sealing liquid may be effected particularly when the seal is employed to maintain a vacuum. It will also be apparent that in accordance with my invention it is not necessary to feed sealing liquid under pressure regardless of whether pressure or vacuum is to be maintained by the seal. It will also be apparent that details of my invention insure equalization of centrifugal force on opposite sides of the sealing member and insure that the increased effectiveness of the sealing liquid due to the centrifugal force acting upon it will be maintained in spite of any tendency of the sealing member to stop the rotation of the sealing liquid or so disperse it or distort its form that a seal might not be preserved. It is also apparent that in accordance with my invention automatic feeding of the sealing liquid may be effected by a vacuum that is preserved by the seal or by circulation of air effected by the rotation of the sealing chamber that carries the sealing liquid.

While I have described several modifications of my invention in great detail I do not intend that my invention shall be limited to the details described but intend that it shall include such modifications and variations as fall within the hereunto appended claims.

What I claim and desire to secure by Letters Patent is:

1. In a sealing device, a rotating member, a cooperating member, an inwardly opening annular chamber mounted for rotation with said rotating member and adapted to contain sealing liquid, a circular outwardly extending member carried by said cooperating member and having its outer circumferential edge within said chamber, a cooler, means for withdrawing liquid from said chamber to said cooler and supplying liquid from said cooler to said chamber during rotation of said chamber while maintaining the outer surface of said chamber substantially liquid-free.

2. In a sealing device, a rotating member having an inwardly opening annular chamber adapted to contain a liquid, a sealing member extending into said liquid within said chamber, and means for maintaining a flow of liquid through said chamber during rotation of said rotating member while maintaining the outer surface of said chamber substantially liquid-free.

3. In a sealing device, a rotating member having an annular chamber adapted to contain a liquid, a sealing member extending into said liquid and dividing the interior of said chamber into similar compartments, means for supplying sealing liquid to said chamber during rotation thereof and similar means on opposite walls of said chamber for imparting to the liquid therein the rotation of said chamber.

4. In a sealing device, a rotating member having secured thereto for rotation therewith an inwardly opening annular chamber adapted to contain a liquid, a stationary sealing member extending into said liquid, means on the walls of said chamber for imparting rotation of said chamber to liquid therein, and means for feeding liquid to said chamber during rotation thereof.

5. In a sealing device, a rotating member having an annular chamber adapted to contain a liquid, a sealing member extending into said liquid, means for feeding liquid to said chamber, a casing having an opening through which said rotating member extends, and means operative upon rotation of said chamber for opposing passage of said liquid through said opening.

6. In a sealing device, a rotating member having an inwardly opening annular chamber adapted to contain a liquid, a sealing member extending into said liquid, means for feeding liquid to said chamber, and wings carried by said chamber to create circulation of air on one side of said chamber.

7. In a sealing device, a rotating member having an inwardly opening annular chamber adapted to contain a liquid, a sealing member extending into said liquid, means for feeding liquid to said chamber, a casing around said chamber and having an aperture through which said rotating member extends, and wings on said chamber positioned to create a circulation of air away from said aperture.

8. In combination with an enclosure having an opening, a shaft passing vertically through said opening and mounted for rotation therein, a casing mounted in said opening and having a downwardly expanding cavity surrounding said shaft, a member in said cavity and provided with an annular chamber and connected to said shaft for rotation therewith and adapted to contain liquid, a sealing member connected to said enclosure and extending into said liquid, and means for feeding liquid to said chamber during rotation thereof.

9. In combination with an enclosure having an opening, a shaft passing vertically through said opening and mounted for rotation therein, a casing mounted in said opening and having a cavity provided with an outlet and surrounding said shaft, a member in said cavity and provided with an inwardly-opening annular chamber and connected to said shaft and adapted to contain liquid, a sealing member connected to said enclosure and extending into said liquid, and means for feeding liquid to said chamber during rotation thereof.

10. In a sealing device, a rotating member having an annular chamber adapted to contain a liquid, a sealing member extending into said liquid and a supply of liquid in continuous communication with the interior of said annular chamber and out of contact with the peripheral surface of said chamber.

11. In a device for maintaining a liquid seal between a rotatable member and a stationary member, an inwardly opening annular chamber secured to said rotatable member and adapted to contain a liquid, a sealing member secured to said stationary member and extending into the liquid space within said chamber, and means for maintaining a continuous supply of liquid to said chamber during rotation thereof while maintaining the external surface of said chamber substantially liquid free.

12. In a device for maintaining a liquid seal between a rotatable member and a stationary member, an inwardly opening annular chamber secured to said rotatable member and adapted to contain a liquid, a sealing member secured to said stationary member and extending into the liquid space within said chamber, means for maintaining subatmospheric pressure within said casing on one side of said sealing member, and means for supplying sealing liquid to the interior of said casing during rotation thereof on said side of said sealing member.

13. In a device for maintaining a liquid seal between a rotatable member and a stationary member, an inwardly opening annular chamber secured to said rotatable member and adapted to contain a liquid, a sealing member secured to said stationary member and extending into the liquid space within said chamber and means for continuously supplying sealing liquid to the interior of said casing on one side of said sealing member from an external source during rotation of said chamber, the edge of said chamber on the other side of said sealing member having an inner diameter less than the peripheral diameter of said sealing member and sufficiently great to provide a discharge opening for the liquid.

14. In a device for maintaining a liquid seal between a rotatable member and a stationary member, an inwardly opening annular chamber secured to said rotatable member and adapted to contain a liquid, a sealing member secured to said stationary member and extending radially outward of the inner edges of the walls of said chamber and into the liquid space within said chamber, and means for maintaining a continuous supply of liquid to the interior of said chamber during rotation thereof.

15. In a device for maintaining a liquid seal between a rotatable member and a stationary member, an inwardly opening annular chamber secured to said rotatable member for rotation therewith and adapted to contain a liquid, a sealing member secured to said stationary member and extending into the liquid space within said chamber and means for feeding liquid to the interior of said chamber during rotation comprising an annular wall coaxial with said chamber and extending from one end thereof, means for maintaining a body of liquid into which said wall extends, and a conduit rotating with said chamber and extending from a point within said chamber that is radially inward of the normal liquid level therein to the exterior of the chamber at a point adjacent the periphery thereof.

In testimony whereof, I have signed my name to this specification.

WILMER H. BATH.